US009938661B2

(12) United States Patent
Menke et al.

(10) Patent No.: US 9,938,661 B2
(45) Date of Patent: Apr. 10, 2018

(54) DEVICE AND METHOD FOR PROCESSING COMPOSITE MATERIALS CONTAINING FIBERS

(71) Applicant: MERI ENVIRONMENTAL SOLUTIONS GMBH, München (DE)

(72) Inventors: Lucas Menke, München (DE); Gisbert Wünsche, Baienfurt (DE); Falk Albrecht, Bad Wurzach (DE)

(73) Assignee: Meri Environmental Solutions GMBH, Munich (DE)

( * ) Notice: Subject to any disclaimer, the term of this patent is extended or adjusted under 35 U.S.C. 154(b) by 0 days.

(21) Appl. No.: 14/915,667

(22) PCT Filed: Aug. 12, 2014

(86) PCT No.: PCT/EP2014/067270
§ 371 (c)(1),
(2) Date: Mar. 1, 2016

(87) PCT Pub. No.: WO2015/032596
PCT Pub. Date: Mar. 12, 2015

(65) Prior Publication Data
US 2016/0222585 A1     Aug. 4, 2016

(30) Foreign Application Priority Data

Sep. 3, 2013 (DE) .................. 10 2013 217 562

(51) Int. Cl.
*D21B 1/32* (2006.01)
*D21C 5/02* (2006.01)
(Continued)

(52) U.S. Cl.
CPC .......... *D21B 1/32* (2013.01); *D21B 1/322* (2013.01); *D21C 5/02* (2013.01); *D21C 9/08* (2013.01); *D21D 5/06* (2013.01); *Y02W 30/646* (2015.05)

(58) Field of Classification Search
CPC ....................................................... D21B 1/32
(Continued)

(56) References Cited

U.S. PATENT DOCUMENTS 3,862,719 A * 1/1975 Muller .................. B22C 5/04
241/180
4,974,781 A   12/1990 Placzek
(Continued)

FOREIGN PATENT DOCUMENTS

EP   1118706 A2   7/2001
EP   1772554 A1   4/2007
(Continued)

OTHER PUBLICATIONS

Smook, Handbook for Pulp and Paper Technologists, 1992, Angus Wilde Publications, 2nd edition, chapter 14.*

*Primary Examiner* — Anthony Calandra
(74) *Attorney, Agent, or Firm* — Larson & Anderson, LLC (57) ABSTRACT

The invention relates to a device for processing composite materials containing fibers, in particular packaging materials containing fibers and in particular used beverage packagings. Said device comprises a double container, which comprises: an inner drum-like container having a hollow cylindrical drum body, which is closed by means of an end bottom at one of two end faces of the drum body and is open at an opposite end face of the drum body, wherein the drum body has screen holes at least on a section of the circumferential surface of the drum body, and wherein at least one baffle is provided at least on a section of the circumferential (Continued)

surface of the drum body and/or on the end bottom, and an outer container, which at least partially surrounds the drum body of the inner, drum-like container, such that an intermediate space is formed between the outer surface of the inner, drum-like container and the inner surface of the outer container, wherein the double container can be pivoted in the vertical plane.

22 Claims, 4 Drawing Sheets

(51) Int. Cl.
    *D21D 5/06*     (2006.01)
    *D21C 9/08*     (2006.01)

(58) Field of Classification Search
    USPC .......................................... 162/4–8, 232–251
    See application file for complete search history.

(56) References Cited

U.S. PATENT DOCUMENTS

| | | | | |
|---|---|---|---|---|
| 5,732,827 | A | * | 3/1998 | Dorscht .................. B07B 1/005 |
| | | | | 209/284 |
| 2002/0096269 | A1 | * | 7/2002 | Bouchette ................ D21B 1/32 |
| | | | | 162/4 |
| 2005/0121371 | A1 | * | 6/2005 | Hautala .................... D21B 1/32 |
| | | | | 209/270 |
| 2005/0236320 | A1 | * | 10/2005 | Didion ..................... B01F 9/06 |
| | | | | 210/323.1 |

FOREIGN PATENT DOCUMENTS

| | | | |
|---|---|---|---|
| JP | 2003251280 A | * | 9/2003 |
| JP | 2011038208 A | | 2/2011 |

* cited by examiner

DEVICE AND METHOD FOR PROCESSING COMPOSITE MATERIALS CONTAINING FIBERS

The present invention relates to an apparatus for processing or reprocessing of composite materials containing fibers, in particular packaging materials containing fibers such as used beverage packaging and to a plant comprising such an apparatus and to a method for processing such composite materials containing fibers.

Composite materials containing fibers, in particular packaging materials containing fibers, which are also known, when used, under the name "used beverage cartons" (UBC), such as beverage cartons, for example for milk, juices or the like, comprise expensive and thus valuable ingredients such as in particular fiber material, plastic such as polyethylene or the like and, optionally, aluminum foil. Some beverage cartons distributed on the market, for example, comprise approximately 70% paper fibers, approximately 25% polyethylene and approximately 5% aluminum foil. For this reason and due to the volume of the quantities of waste packaging materials which arise every day, it is economically interesting and in particular also eco-politically desired to recycle or reprocess composite materials containing fibers in order to separate their ingredients from one another and to reuse them.

Known methods for processing used packaging materials and in particular for reclaiming the fiber material comprise the steps of presorting the packaging material, comminuting the presorted packaging material, dissolving the comminuted packaging material with water in a pulper, transferring the dissolved mixture obtained in the pulper into a screen drum and separating the mixture in the screen drum into a fraction rich in fiber and into a fraction low in fiber and transferring the fraction rich in fiber into a washing device and washing it. Such methods are in particular used today for smaller communal plants having a quantity of packaging material to be processed in an order of magnitude of 10 to 15 metric tons (tonnes) per day.

However, the composition of the packaging materials differs from country to country due to different technical demands and statutory provisions and due to different product compositions which are stored in the packagings. In some countries, beverage cartons, for example, contain greater quantities of additives to increase the wet strength, said additives substantially serving a higher resistance toward moisture from the outside or toward condensed water arising due to temperature gradients. Materials having such additives to increase the wet strength have different dissolving properties in a pulper than corresponding packagings without such additives. For this reason, the plants based on the known methods for the processing of composite materials containing fibers and in particular of packaging materials containing fibers are specifically designed and operated in dependence on the material to be processed.

Due to the comparatively small flexibility of the known processing plants with respect to the variation of the composition of the starting material—in particular with respect to additives to increase wet strength—It must also be ensured in the operation of these plants that respectively identical pretreated starting material is used. There is therefore, for example, a lack of the flexibility of being able to use both starting material having a comparatively small degree of contamination and such material having a comparatively high degree of contamination.

A further disadvantage of known plants for processing composite materials containing fibers and in particular packaging materials containing fibers is that, due to the large number of plant parts required, they are comparatively complex, require a complex control and take up room. For these reasons, they are associated both with high investment costs and with high operating costs.

Apart from this, the known plants also have the disadvantage that they can only dissolve the composite material containing fibers into its individual components, but without being able to carry out a pre-purification with water in the apparatus provided for the dissolving in order to be able to (pre-)purify the composite material, for example from fatty substances such as milk, prior to its dissolving.

Finally, the known plants also have the disadvantage that they cannot be expanded with respect to their capacity for starting material to be processed daily due to their design from a plurality of plant parts or can at least only be expanded with a high cost effort.

Starting from this, it is the object of the present invention to provide an apparatus for processing composite materials containing fibers, in particular packaging materials containing fibers, and in particular used beverage cartons, which not only results in an efficient and complete separation of the composite materials into fiber material, on the one hand, and into plastic or metal, such as aluminum, on the other hand, but which is in particular also very flexible with respect to the composition (in particular with regard to additives for increasing wet strength) and with respect to the purity of the starting material of the composite material containing fibers to be used, the apparatus in particular also being of a simple design, which is simple to operate and to control, and additionally being able to be expanded inexpensively in modular form with respect to the capacity of starting material to be processed per unit of time in which the starting material can be pre-purified with water, and finally being characterized by comparatively low investment costs and operating costs.

This object is satisfied in accordance with the invention by an apparatus for processing composite materials containing fibers, in particular packaging materials containing fibers, having a dual tank which comprises:

an inner drum-like tank having a hollow cylindrical drum jacket which is closed at the face base at one of its two face ends and which is open at its oppositely disposed face end, wherein the drum jacket has screen holes at at least a section of its peripheral surface, and wherein at least one baffle is provided at at least one section—preferably on a different section—of the peripheral surface of the drum jacket and/or on the face base; and an outer tank which at least partly surrounds the drum jacket of the inner drum-like tank such that an intermediate space is formed between the outer surface of the inner drum-like tank and the inner surface of the outer tank, wherein the dual tank is pivotable in the vertical plane.

This solution is based on the surprising recognition that an apparatus has a dual tank which is configured in this manner and whose inner drum tank has screen holes on its peripheral surface, wherein at least one baffle is additionally provided on the peripheral surface of the drum jacket and/or on the face base, and which is pivotable in the vertical plane, not only achieves an exceptional dissolving with water of composite materials containing fibers, in particular of packaging materials containing fibers such as used beverage cartons, into the individual components, namely fiber materials, plastic and, optionally, metal such as aluminum, that is takes on the function of a pulper, but also in particular also results in an exceptional separation of the individual components into fiber suspension, on the one hand, and residual material of plastic and, optionally, metal, on the other hand, and also in a good purity of the separated fiber suspension and of the residual material, that is also satisfies the function of a screen drum and that of a downstream washing device. Apart from this, the apparatus in accordance with the invention also allows the carrying out of a pre-purification of the starting material in which the starting material is purified, for example, from fatty substances such as milk, before its dissolving into the individual components with water. In this respect, on a revolving or rotation of the inner tank, the at least one baffle (which acts as a disrupting edge) effects a mechanical stress on the mixture of water and starting material contained in the inner tank and thus boosts the dissolving of the starting material with water into the individual components and facilitates a pre-purification of the starting material with water, whereas a separation of the mixture of individual components dissolved with water contained in the inner tank into a fraction rich in fiber and into a fraction low in fiber is achieved by the screen holes. In this respect, this combination of functions is achieved in accordance with the invention in that the dual tank is pivotable in the vertical plane and can therefore be operated in different positions, wherein each of these different positions is optimized for a respective one of the aforesaid functions, namely pre-purification of the composite material containing fibers, dissolving of composite materials containing fibers into their individual components, separation of the individual components into fiber suspension and residual material of plastic and, optionally, metal, and washing of the fiber suspension and of the residual material. The volume of ingredients such as the starting material and water which can be filled into the hollow cylindrical drum jacket of the inner tank of the dual tank can thus be set by a corresponding setting of the pivot angle of the dual tank (i.e. of the angle between the central longitudinal axis of the hollow cylindrical drum jacket and of the horizontal plane). That is, the closer the pivot angle approaches 90° with respect to the horizontal plane, the more water or starting material can be poured into the hollow cylindrical drum jacket, whereas, at a pivot angle of 0° with respect to the horizontal plane, that is with a horizontal alignment of the dual tank, the total liquid runs out via the screen holes out of the hollow cylindrical drum jacket of the inner tank into the intermediate space provided between the inner tank and the outer tank. Apart from this, it can also be directly controlled via the set pivot angle of the dual tank whether the mixture of water and composite material containing fibers to be processed introduced into the inner tank selectively or at least predominantly only contacts the section of the drum jacket of the inner tank at which the at least one baffle is provided for improving the dissolving or the pre-purification or the washing of the composite material, that is whether primarily a dissolving or pre-purification (without separation of the individual components) or washing (without separation of the individual components) of the composite material takes place or whether the mixture of water and composite material containing fibers to be processed introduced into the inner tank also contacts the section of the drum jacket of the inner tank at which the screen holes are provided for separating the mixture into fiber suspension and residual material, that is a separation of the dissolved components of the composite material takes place into a fraction rich in fibers and into a fraction low in fibers. If, for example, the baffle(s) for dissolving the starting material to be processed with water is/are arranged at the end of the peripheral surface of the drum jacket adjacent to and/or at the face base and the screen holes are arranged at the end of the peripheral surface of the drum jacket disposed opposite it, it can be achieved, for example, by pivoting the end of the inner tank disposed opposite the face base to an angle of 30 to 90° with respect to the horizontal that the mixture of starting material and water only contacts or at least predominantly contacts the section of the peripheral surface of the drum jacket of the inner tank at which the baffle(s is/are provided with a corresponding degree of filling of the inner tank. Due to the mechanical stress of the mixture by the baffle(s), a pre-purification of the starting material with water and/or a dissolving of the starting material with water into the individual components is then achieved by revolving or rotating the inner tank in this position, with the degree of pre-purification and the degree of dissolving being able to be directly set by the duration in times for which these method steps are carried out. If the pivot angle of the dual tank is then reduced, the dissolved mixture in the inner tank also contacts the section of the peripheral surface of the drum jacket in which the screen holes are provided so that then fiber suspension runs through the screen holes into the intermediate space formed between the inner tank and the outer tank, whereas the residual material is retained in the interior of the inner tank. If the pivot angle is subsequently increased again, the volume of the inner tank available for the watery mixture is again increased so that the mixture contained in the inner tank can be washed by the repeat introduction of water. The fiber suspension can then be removed from the intermediate space and the residual material containing plastic and, optionally, metal can be removed from the interior of the inner tank by a subsequent reduction of the pivot angle to 0°.

The individual steps can be simply adapted to the composition and to the degree of purity of the starting material by setting the times of the individual method steps described above and the desired degree of pre-purification of the starting material, the degree of dissolving of the starting material with water can in particular be tailored in dependence on the composition and on the purity of the starting material. The apparatus in accordance with the invention is very flexible with respect to the composition and to the purity of the starting material of the composite material containing fibers to be used for this reason.

The apparatus in accordance with the invention can in particular also be simply configured, can be simple to operate and can be simple to control due to the above-described design, i.e. due to the integration of dissolving device, separating device and washing device, in one apparatus, namely the dual tank. In addition, due to this, the apparatus can also be expandable simply and inexpensively in a modular manner with respect to the capacity for starting material to be processed per unit of time, namely in that a second correspondingly dimensioned dual tank is added to the apparatus. The apparatus in accordance with the invention is in particular also characterized by comparatively low investment costs and operating costs due to the compact and simple embodiment. The apparatus in accordance with the invention is in particular also suitable for the processing of composite material containing fibers with a throughput of 3 to 100 tonnes per day, wherein the composite material containing fibers can include any kind of fiber material such as in the form of cardboard or paper, any kind of plastic such as polyethylene, for example, and any kind of metal such as aluminum foil, for example. The apparatus in accordance with the invention is thus suitable for the processing of packaging materials containing fibers such as used beverage cartons.

As presented above, the dual tank of the apparatus is pivotable in the vertical plane in accordance with the invention. To be able to achieve an exceptional dissolving of the starting material containing fibers in the inner tank of the dual tank with water, it is proposed in a further development of the idea of the invention that the inner drum-like tank is rotatable in at least one of its two peripheral directions, i.e. in the peripheral direction of the drum jacket. This can be achieved in all the manners familiar to the skilled person, and indeed, for example, in that a rotatable shaft is attached to the face base of the inner tank and in that it is connected to a rotating motor. By revolving or rotating the inner tank, the mixture of water and starting material filled therein repeatedly comes into contact with the at least one baffle and is as a result mechanically strained, whereby the dissolving of the starting material with water into the individual components is promoted.

To achieve the aforesaid effects particularly easily, it is moreover preferred that the inner drum-like tank is rotatable at a step-wise adjustable speed in at least one of its two peripheral directions. The rotational speed can thereby simply be set to a value ideal for the dissolving of the starting material.

It is further preferred for the increase of the effect of the at least one baffle attached to a section of the peripheral surface of the drum jacket and/or to the face base that the inner drum-like tank is rotatable in both of its two peripheral directions and the direction of rotation can be changed from one peripheral direction to the other and vice versa. The mechanical stress exerted per baffle on the mixture contained in the inner tank can thereby be increased.

In accordance with a further preferred embodiment of the present invention, the dual tank is pivotable by an angle of more than 0 to 45° and preferably of more than 0 to 90° with respect to the horizontal plane. It is thereby achieved that the effects achieved above with respect to the pivotability of the dual tank are achieved particularly easily and the dual tank can in particular be pivoted to any angle suitable for the satisfaction of the desired function.

It is of advantage in this respect if the dual tank is pivotable step-wise by an angle of 0 to 45° and preferably by 0 to 90° with respect to the horizontal plane. The above-stated angles respectively relate to a pivoting of the dual tank at the end disposed opposite the face base of the inner tank.

The pivotability can be achieved in all suitable manners. The dual tank can, for example, be supported on a suitably constructed pivotable rack. In this respect, the rack can, for example, comprise two arms which extend in parallel with the longitudinal direction of the outer tank, wherein the two arms are connected via a cross-beam at the end disposed opposite the face base of the inner tank on which the corresponding end of the outer tank or of the inner tank (if the outer tank does not extend over the total length of the inner tank) lies. The arms of the rack can likewise be connected by a cross-beam at the end disposed opposite this cross-beam. In this respect, at least one of the arms or cross-beams is connected to a pivot mechanism via which the pivot angle of the dual tank can be set.

To be able to particularly easily satisfy the function of the improvement of the dissolving or of the pre-purification or washing of the starting material contained in the inner tank of the dual tank as a result of mechanical strain, it is proposed in a further development of the idea of the invention that the at least one baffle is provided at the inner side of at least one section of the peripheral surface of the drum jacket and/or on the face base of the inner tank and is preferably inwardly directed (i.e. into the inner space of the inner tank surrounded by the drum jacket). It is particularly preferred in this respect that the section of the peripheral surface of the drum jacket at which the at least one baffle is provided is separate from the section of the peripheral surface of the drum jacket at which the screen holes are provided or is at least partly separate from it, that is the two sections overlap at most partially. It is thereby ensured that it can be achieved by a corresponding setting of the pivot angle of the dual reactor that liquid contained in the inner tank only comes into contact with the section provided with a baffle or baffles.

To particularly effectively improve the dissolving with water of the starting material contained in the inner tank of the dual tank, provision is made in accordance with a further preferred embodiment of the present invention that the drum jacket and/or the face base of the inner drum-like tank has 1 to 60, preferably 1 to 24, and particularly preferably 1 to 6 baffles, viewed in the cross-section of the inner tank. The baffles are preferably uniformly distributed over the inner surface of the periphery of the drum jacket and/or on the face base.

To achieve that the mixture of water and starting material contained in the inner tank can be selectively brought into contact only with the section of the drum jacket provided with a baffle or with baffles by a sufficiently high pivoting of the dual tank, it is moreover preferred that the baffle or all the baffles is/are arranged at the inner side of a section of the peripheral surface of the drum jacket adjacent to the face base and/or on the face base.

In the aforesaid embodiment, it is moreover preferred that the at least one baffle or, if more than one baffle is provided, at least some of the baffles is/are arranged at the inner side of a section of the peripheral surface of the drum jacket which—starting from the end provided with the face base, viewed in the longitudinal axis of the drum jacket—extends over 15 to 30%, preferably 10 to 30%, particularly preferably 0 to 40%, and very particularly preferably 0 to 50%, of the longitudinal extent of the drum jacket periphery. In the last-named case, this section thus extends over the first half—starting from the end provided with the face base—of the peripheral surface of the inner tank and, in the first-named case, if the inner tank, for example, has a length of 3 meters, over the part of the peripheral surface of the inner tank which starts 30 cm remote from the face base and ends 90 cm remote from the face base.

The at least one baffle can generally adopt any desired shape. It can, for example, be an elevated portion which extends inwardly from the inner peripheral surface of the drum jacket and which is of the shape of an arc of a circle, elliptical, oval, rectangular or polygonal in cross-section. In this respect, the elevated portion can, for example, be formed by stamping the peripheral surface from the outer side. The baffle can extend exactly in the peripheral direction of the drum jacket, exactly in the longitudinal direction of the drum jacket or both in the longitudinal direction and in the peripheral direction of the drum jacket. In the last-named case, the at least one baffle is arranged in spiral shape at the inner surface of the drum jacket. The at least one baffle preferably extends exactly in the longitudinal direction of the drum jacket or both in the longitudinal direction and in the peripheral direction and particularly preferably exactly in the longitudinal direction or the drum jacket.

It is proposed in a further development of the idea of the invention that the at least one baffle has an asymmetrical cross-section, wherein the cross-section in this case designates the section of the baffle in the plane perpendicular to the longitudinal axis of the drum-like tank. In this case of an asymmetrical cross-section, the mechanical stress which the at least one baffle exerts on the mixture contained in the inner tank differs in dependence on the direction of rotation of the inner tank. In this manner, the at least one baffle can, for example and preferably, be configured such that—when the inner tank is rotated in a first peripheral direction of the drum tank—the mixture contained in the drum tank is strained so much mechanically that an ideal dissolving of the composite material containing fibers with water takes place, whereas—when the inner tank is rotated in the opposite peripheral direction of the drum tank—the baffle(s) only strain(s) the mixture contained in the drum tank weakly mechanically, but the mixture is only well mixed so that the water washes the solid contained therein without noticeably dissolving the composite material containing fibers.

The at least one baffle can, for example, have a wedge-shaped or triangular cross-section which is divided into two parts by the straight line extending from the central longitudinal axis of the drum jacket in the radial direction through the wedge tip, wherein the first angle $\alpha_1$ between the straight line extending from the central longitudinal axis of the drum jacket in the radial direction through the wedge tip and the line bounding the first part of the baffle, starting from the wedge tip, differs from the second angle $\alpha_2$ between the straight line extending from the central longitudinal axis of the drum jacket in the radial direction through the wedge tip and the line bounding the second part of the baffle, starting from the wedge tip.

It is preferred in the aforesaid embodiment that the first angle $\alpha_1$ amounts to between 45 and 165°, and preferably between 80 and 140°, and/or the second angle $\alpha_2$ amounts to between 165 and 45°, and preferably between 140 and 80°.

Provision is made in an alternative, particularly preferred embodiment that the first angle $\alpha_1$ amounts to between more than 90 and 140° and the second angle $\alpha_2$ amounts to between 40 and 80° or vice versa. In this case, the at least one baffle has a comparatively sharp side, namely that with the angle between more than 90 and 140°, and a comparatively "gentle" side, namely that with the angle between 40 and 80°. In this manner, the at least one baffle is configured such that—when the inner tank is rotated in a first peripheral direction of the drum tank in which the mixture is exposed to the sharp side of the baffle(s)—the mixture contained in the drum tank is stressed so much mechanically that an ideal dissolving of the composite material containing the fibers with water takes place, whereas—when the inner tank is rotated in the opposite peripheral direction of the drum tank in which the mixture is exposed to the gentle side of the baffle(s)—the baffle(s) only strain(s) the mixture contained in the drum tank weakly mechanically, but said mixture is only well mixed so that the water washes the solid contained therein without noticeably dissolving the composite material containing fibers.

Provision is made in accordance with a further improved embodiment of the present invention that the at least one baffle has a height of at least 3 cm, and preferably of at least 10 cm, extending inwardly from the peripheral surface of the drum jacket in the radial direction.

The present invention is not generally restricted with respect to the dimensions of the dual tank and of the drum jacket. Good results are, however, obtained, for example, when the diameter of the drum jacket of the inner drum-like tank amounts to 100 to 600 cm, preferably 150 to 350 cm, and particularly preferably 180 to 320 cm, and/or the length of the drum jacket of the inner drum-like tank amounts to 100 to 800 cm, preferably 150 to 600 cm, and particularly preferably 250 to 550 cm.

As presented above, the baffles do not have to be arranged on the peripheral surface of the drum jacket of the inner tank, but all the baffles or some of the baffles can rather be provided on the face base of the inner tank. In this respect, the at least one baffle can be arranged radially, tangentially or in spiral shape on the face base. In another respect, the geometries and dimensions described above with respect to the baffles arranged at the peripheral surface of the drum jacket also apply to the baffles arranged on the base face of the inner tank.

The baffles arranged on the face base of the inner tank preferably have a larger height than the baffles arranged at the peripheral surface of the drum jacket. The height of the baffles arranged on the face base of the inner tank preferably amounts to 1 to 50 cm, and particularly preferably 15 to 30 cm.

Provision is made in accordance with a further preferred embodiment of the present invention to achieve that the mixture of water and starting material contained in the inner tank is only selectively brought into contact with the section of the drum jacket provided with a baffle or baffle(s by a pivoting of the dual tank at a comparatively high pivot angle and thus only a pre-purification and/or dissolving of the starting material with water (without separation of the mixture into different fractions) can be achieved, but the mixture of water and starting material contained in the inner tank is also brought into contact with the section of the drum jacket provided with the screen holes by a setting of a lower pivot angle of the dual tank and a separation of the dissolved mixture into a fraction rich in fiber and into a fraction low in fiber can thus be achieved, that the screen holes are arranged on a section of the peripheral surface of the drum jacket of the inner drum-like tank, wherein this section of the peripheral surface, starting from the end provided with the face base, viewed in the longitudinal axis of the drum jacket, extends over 80 to 90%, preferably 70 to 90%, particularly preferably 65 to 95%, and very particularly preferably 60 to 95%, of the longitudinal extent of the drum jacket periphery. In the case of an extent of the section at 60 to 95% of the longitudinal extent of the drum jacket periphery, this means that this section extends—when, for example, the inner tank has a length of 3 meters—over that part of the peripheral surface of the inner tank which starts 180 cm remote from the face base and which ends 15 cm before the end of the peripheral surface of the inner tank disposed opposite the face base. In this respect, the screen holes in this embodiment are preferably distributed evenly over the corresponding section of the peripheral surface of the drum jacket.

To achieve a sufficiently high separation performance of the dissolved mixture contained in the inner tank into a fraction rich in fiber and into a fraction low in fiber, it is proposed in a further development of the idea of the invention that the sum of the surfaces of the openings of the individual screen holes amount, with respect to the total surface of the section of the peripheral surface of the drum jacket in which they are provided, to 5 to 95%, preferably to 15 to 75%, and particularly preferably to 20 to 50%. That section of the drum jacket is in this respect understood as the section of the peripheral surface of the drum jacket in which the screen holes are provided which is obtained by a rectangular cutting of the drum jacket at the two points at which the screen holes are arranged disposed furthest apart on the peripheral surface—viewed in the longitudinal direction. In this respect, the screen holes in this embodiment are also preferably distributed evenly over the corresponding section of the peripheral surface of the drum jacket.

In addition to the screen holes arranged on the peripheral surface of the drum jacket of the inner tank, at least one or more screen holes can also be arranged on the face base of the inner tank. These screen holes in particular allow a separation of the dissolved mixture contained in the inner tank into a fraction rich in fibers and into a fraction low in fibers at a very high pivot angle of, for example, close to 90° with respect to the horizontal, in that the fraction rich in fibers flows off through these screen holes. Alternatively or additionally to this, the provision of screen holes also on the face base of the inner tank can also allow a pre-purification of the starting material with water prior to the dissolving of the starting material in that the inner tank is filled with starting material and water and is rotated at a very high pivot angle in one of the peripheral directions, wherein water runs off through the screen holes provided on the face base together with the dissolved away contaminants such as fat. The provision of screen holes on the face base of the inner tank can furthermore also facilitate a washing of the dissolved starting material in that the inner tank with the dissolved starting material is filled with water and is rotated in one of the peripheral directions at a very high pivot angle, wherein water runs off through the screen holes provided on the face base together with the dissolved away contaminants.

It is preferred, to achieve a sufficiently good purification of the starting material, which may have already been dissolved, with water and/or a sufficiently high separation performance of the dissolved mixture contained in the inner tank into a fraction rich in fibers and into a fraction low in fibers, that the surfaces of the openings of the individual screen holes—and indeed both those arranged on the peripheral surface of the drum jacket of the inner tank and those which may be arranged on the face base of the inner tank—each amount to 0.03 to 20 cm², preferably 0.2 to 10 cm², and particularly preferably 0.12 to 5 cm². In this respect, the screen holes in this embodiment are also preferably distributed evenly over the corresponding section of the peripheral surface of the drum jacket or over the face base of the inner tank.

The present invention is generally not particularly limited with respect to the geometry of the screen holes. However, screen holes having an elliptical, circular, rectangular or quadratic cross-section have, for example, proved particularly suitable for their purposes.

For example, scree holes having a circular cross-section with a diameter in each case of 0.2 to 5 cm, preferably 0.35 to 2.5 cm, and particularly preferably 0.4 to 1.8 cm, have proven particularly suitable. In this respect, the screen holes in this embodiment are also preferably distributed evenly over the corresponding section of the peripheral surface of the drum jacket.

Provision is made in accordance with a further preferred embodiment of the present invention that the outer tank surrounds the drum jacket of the inner drum-like tank, starting from the end provided with the face base, viewed in the longitudinal axis of the drum jacket, over the full area by at least 50%, particularly preferably by at least 70%, and very particularly preferably by at least 80%. A sufficiently large intermediate space between the inner tank and the outer tank is thereby ensured for receiving the fraction rich in fibers. In this connection, over the full area means that the end of the inner tank provided with the face base and the aforesaid longitudinal section of the total peripheral surface of the drum jacket are surrounded completely, i.e. over the full area, by the outer tank.

The outer tank of the dual tank can generally have any desired geometry. It can in particular be hollow cylindrical or frustoconical.

It is proposed in a further development of the idea of the invention that the outer tank has the shape of an asymmetrical truncated cone, wherein a section of the peripheral surface of the asymmetrical truncated cone to the base surface of the asymmetrical truncated cone has an angle $\beta_1$ of 80 to 100° and the other section of the peripheral surface of the asymmetrical truncated cone to the base surface of the asymmetrical truncated cone has an angle $\beta_2$ of 60 to 80°. It is thereby achieved that a part region of the outer tank at the end of the inner tank provided with the face base is "round bodied", and indeed preferably on the lower side of the dual tank such that, on the rotation of the inner tank, liquid flowing through the screen holes into the intermediate space collects in this "rounded region" and can be withdrawn from there. In contrast to the inner tank, the outer tank is not rotated in the operation of the dual tank.

Good results are in particular achieved in this respect when the angle $\beta_1$ amounts to 85 to 95°, and preferably to approximately 90°, and/or the angle $\beta_2$ amounts to 65 to 75°, and preferably to approximately 70°.

The end of the outer tank which is adjacent to the end of the drum jacket provided with the face base can generally be closed in any desired manner. Good results are in particular obtained when the outer tank is bounded by a torispherical head at its end facing the end of the drum jacket of the inner drum-like tank provided with the face base. In this case, the above-described angles $\beta_1$ and $\beta_2$ are calculated starting from the plane of the topmost margin of the torispherical head.

The present invention is generally not particularly restricted with respect to the volume of the intermediate space provided between the outer tank and the inner tank. It should, however, be so large that a sufficient quantity of liquid can be collected there, but as little as possible so that the apparatus remains as compact as possible. It has proven advantageous while taking this into account that the minimal spacing between the outer surface of the inner drum-like tank and the inner surface of the outer tank amounts to 5 to 75 cm, and preferably to 8 to 30 cm. In this respect, minimal spacing is understood as the spacing at the narrowest point of the intermediate space.

For the same reason, it is preferred that the maximum spacing between the outer surface of the inner drum-like tank and the inner surface of the outer tank amounts to 15 to 100 cm, and preferably to 10 to 50 cm. In this connection, maximum spacing is understood as the spacing at the widest point of the intermediate space.

Provision is made in accordance with a further advantageous embodiment of the present invention that at least one deflection means is provided at the inner surface of the inner drum-like tank. This allows the fraction low in fiber which contains the remaining plastic after the separation of the fraction rich in fiber and which has a pulp-like consistency to be easily removed from the inner space of the inner tank.

Good results are, for example, achieved in this respect when the at least one deflection means is of spiral shape and preferably extends over at least 50%, particularly preferably over at least 70%, very particularly preferably over at least 90°, and most preferably over the total length of the drum-like tank. The deflection means in this embodiment preferably has a rectangular or triangular cross-section.

A further subject of the present invention is a plant for the processing of composite materials containing fibers, in particular of packaging materials containing fibers, said plant comprising:
- a previously described apparatus in accordance with the invention;
- a solid/liquid separation apparatus; and
- a press.

In this respect, the solid/liquid separation apparatus is preferably connected via a line to the intermediate space of the dual tank of the apparatus so that, in the operation of the plant, the fraction rich in fibers can be conducted from the intermediate space continuously or lot-wise—in a regulated or unregulated manner—into the solid/liquid separation apparatus where it is then thickened, that is it is separated into pure or almost pure water and into thickened fiber suspension. While the thickened fiber suspension is removed from the plant as recycled raw material and can optionally be further purified, the water can be led back into the apparatus in accordance with the invention of the plant in accordance with the invention. It is preferred for this purpose that a liquid return line is provided in the plant which leads from the solid/liquid separation device into the hollow cylindrical drum jacket of the inner drum-like tank.

To achieve a good solid/liquid separation, it is preferred that the solid/liquid separation device is a thickener, a forming board or screen and, particularly preferably, a disk thickener.

For the further purification of the liquid obtained in the solid/liquid separation apparatus, that is of the filtrate, of, for example, fat, milk residues or the like, the plant in accordance with the invention can furthermore comprise a chemophysical separation device such as a dissolved air flotation device, a centrifuge device or a sedimentation device which can be connected to the solid/liquid separation apparatus via a corresponding liquid line.

To achieve a particularly effective drying of the pulp which contains plastic and optionally metal and which is removed from the dual tank from the inner space of the inner tank, it is advantageous to provide a screw press or a stamp press as the press in the plant and to connect it via a line to the inner space of the hollow cylindrical drum jacket of the inner drum-like tank.

The present invention further relates to a method for processing composite materials containing fibers, in particular packaging materials containing fibers, said method comprising the following steps:
a) pivoting the dual tank of a previously descried apparatus in accordance with the invention upward with the end of the inner tank disposed opposite the end provided with the face base such that the longitudinal axis of the drum-like tank adopts an angle $\gamma_1$ of 5 to 90° with respect to the horizontal plane;
b) introducing composite material containing fibers to be processed and water into the inner space of the hollow cylindrical drum jacket of the inner tank pivoted in the step a) and rotating the inner tank about one of its two peripheral directions for a duration in time $t_1$;
c) reducing the pivot angle of the dual tank to an angle $\gamma_2$ with respect to the horizontal plane, where $0 \leq \gamma_2 < \gamma_1$, and rotating the inner drum-like tank about one of its two peripheral directions for a duration in time $t_2$;
d) optionally, increasing the pivot angle of the dual tank to an angle $\gamma_3$ with respect to the horizontal plane, where $\gamma_2 < \gamma_3 \leq 90°$, introducing water into the hollow cylindrical drum jacket of the inner tank and rotating the inner tank about its longitudinal axis for a duration in time $t_3$; and
e) reducing the pivot angle of the dual tank to an angle of 0° with respect to the horizontal plane and removing the remaining pulp from the hollow cylindrical drum jacket of the inner drum-like tank.

Good results are in particular obtained in this respect when the angle $\gamma_1$ in the step a) and/or the angle $\gamma_3$ in the step d) is/are set to a value of 5 to 60°, preferably of 10 to 50°, and particularly preferably of 15 to 50°, and very particularly preferably of approximately 40°.

To achieve a sufficient dissolving of the starting material into its components and/or to achieve a sufficient washing efficiency, it is proposed in a further development of the idea of the invention that the duration in time $t_1$ in the step b) and/or the duration in time $t_3$ in the step d) is/are set to 5 to 180 minutes, and preferably to 10 to 90 minutes.

A good separation of the fraction rich in fibers is in particular obtained in the step c) when the angle $\gamma_2$ is set to a value of 10 to 50°, preferably of 20 to 45°, and particular preferably of 25 to 35°.

In this respect, the duration in time $t_2$ in the step c) can advantageously be set to 5 to 180 minutes, and preferably to 10 to 90 minutes.

The suspension containing fibers can be removed continuously or lot-wise from the intermediate space of the dual tank, and indeed, for example, during the step b), and/or between the steps b) and c), and/or during the step c), and/or between the steps c) and d), and/or during the step d), and/or between the steps d) and e), and/or after step e).

In accordance with another preferred embodiment of the present invention, the suspension containing fibers is led into the solid/liquid separation apparatus and is there separated into a fraction rich in water and into a fraction rich in fibers, wherein the fraction rich in water is preferably led back Into the inner space of the hollow cylindrical drum jacket of the inner drum-like tank and the fraction rich in water is preferably led into a purification deice to purify it further. The solid/liquid separation apparatus can advantageously be a thickener, a forming board or screen, and in particular a disk thickener, whereas the purification device can, for example be a dissolved air flotation device.

The remaining pulp removed in the step e) is preferably led into a press and is dried there.

In accordance with a further, very particularly preferred embodiment of the present invention, a pre-purification of the starting material is also carried out in the step b) and screen holes are preferably provided for this purpose in the face base of the inner tank of the dual tank of the apparatus. On the rotation of the inner tank in the step b), the water then washes off contaminants such as fat from the starting material and the washing water is removed via screen holes arranged in the face base before then fresh water is refilled into the inner tank and the inner tank is rotated further—optionally at a smaller pivot angle—to dissolve the starting material into the individual components.

It is proposed in a further development of the idea of the invention that the method is carried out in an apparatus which comprises asymmetrical baffle(s) and the rotational direction of the inner tank of the apparatus is changed during the method. At least one baffle preferably has a wedge-shaped cross-section which is divided into two parts by the straight line extending from the central longitudinal axis of the drum jacket in the radial direction through the wedge tip, wherein the first angle $\alpha_1$ between the straight line extending from the central longitudinal axis of the drum jacket in the radial direction through the wedge tip and the line bounding the first part of the baffle, starting from the wedge tip, differs from the second angle $\alpha_2$ between the straight line extending from the central longitudinal axis of the drum jacket in the radial direction through the wedge tip and the line bounding the second part of the baffle, starting from the wedge tip. In this respect, the first angle $\alpha_1$ preferably amounts to between more than 90° and 140° and the second angle $\alpha_2$ preferably amounts to between 40 and 80°. In this case, the at least one baffle has a comparatively sharp side, namely that with the angle between more than 90 and 140°, and a comparatively "gentle" side, namely that with the angle between 40 and 80°. In this manner, on the carrying out of the method, when the inner tank is rotated in a first peripheral direction of the drum tank in which the mixture is exposed to the sharp side of the baffle(s)—the mixture contained in the drum tank is stressed so much mechanically that an ideal dissolving of the composite material containing fibers with water takes place, whereas—when the inner tank is rotated in the opposite peripheral direction of the drum tank in which the mixture is exposed to the gentle side of the baffle(s)—the baffle(s) only strain(s) the mixture contained in the drum tank weakly mechanically, but said mixture is only well mixed so that the water washes the solid contained therein without noticeably dissolving the composite material containing fibers.

The method in accordance with the invention is in particular suitable for processing composite material which contains i) fiber material, preferably in the form of pulp or paper, ii) plastic, preferably polyethylene, and optionally, iii) aluminum foil. Corresponding packaging material is therefore preferably introduced into the drum-like tank in the step b).

Used beverage cartons can in particular be used in the step b).

The present invention will be described in the following purely by way of example with reference to advantageous embodiments and to the enclosed drawings.

There are shown.

Figure 1:
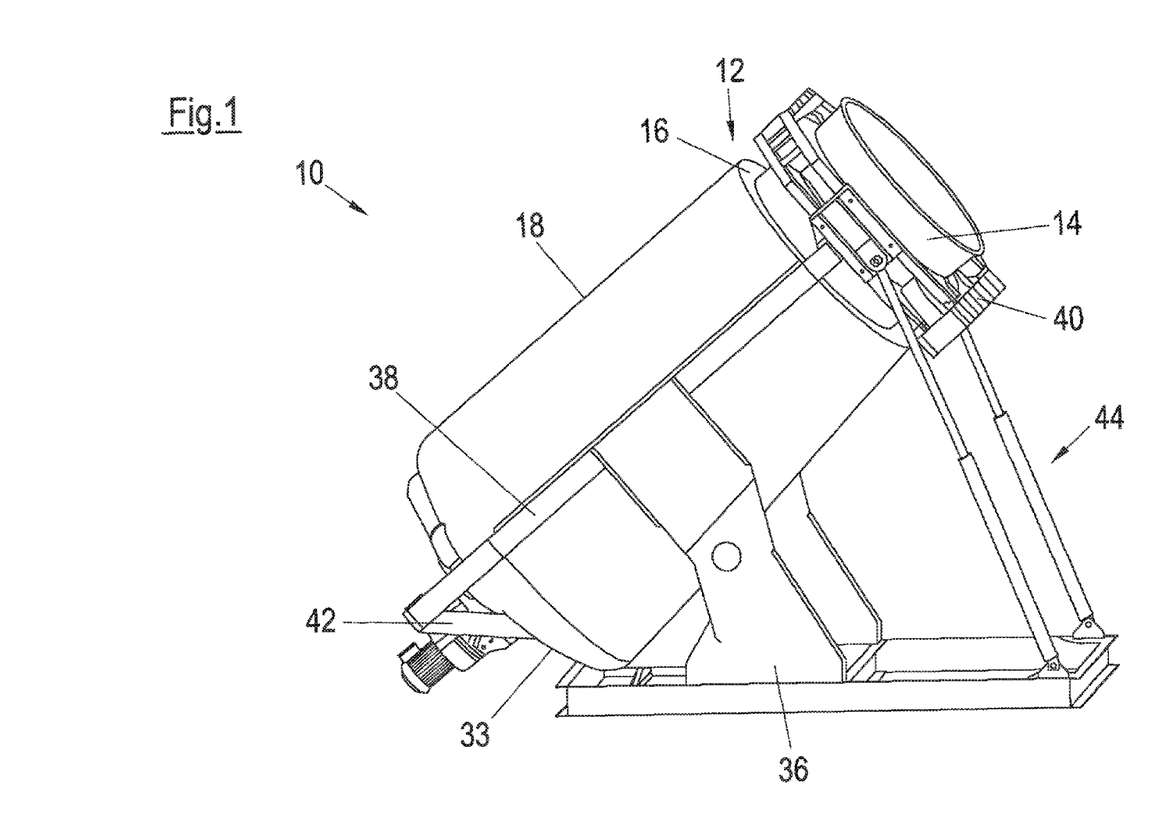
FIG. 1 a schematic perspective view of an apparatus for processing composite materials containing fibers in accordance with an embodiment of the present invention.
Figure 2:
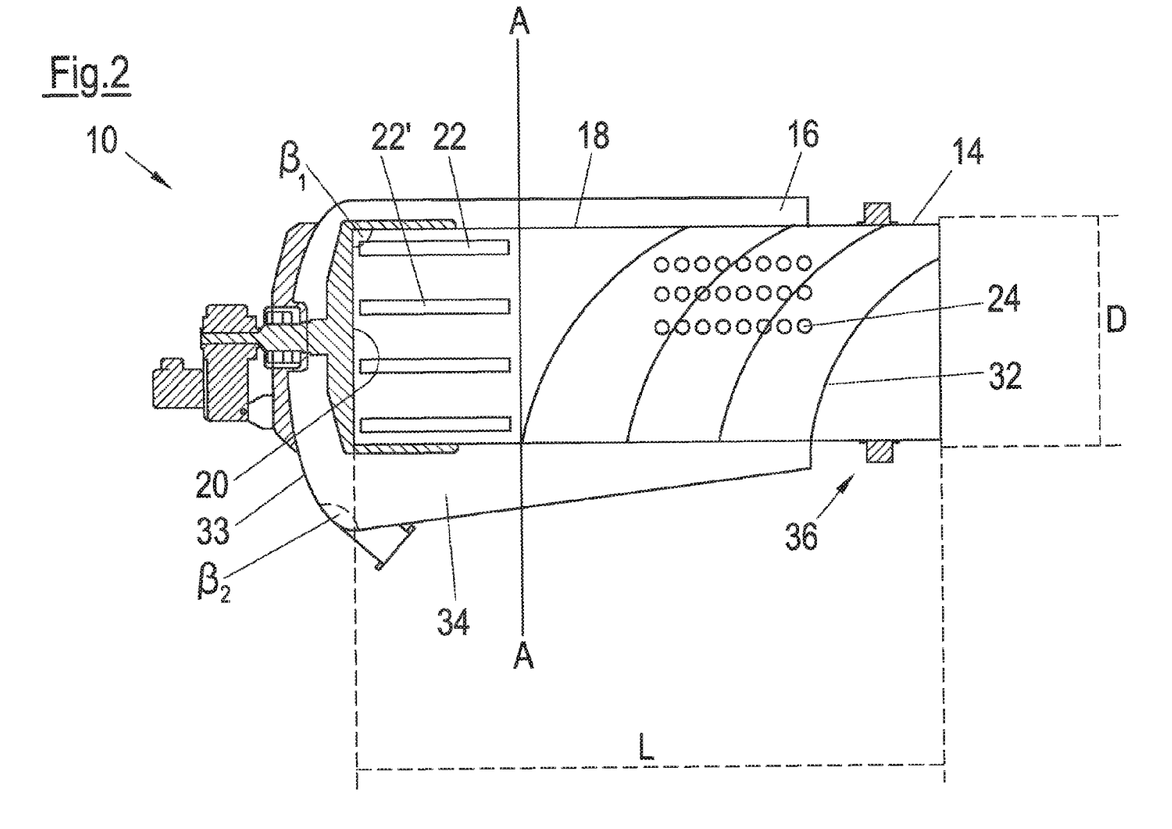
FIG. 2 a longitudinal sectional view of the apparatus shown in FIG. 1.
Figure 3:
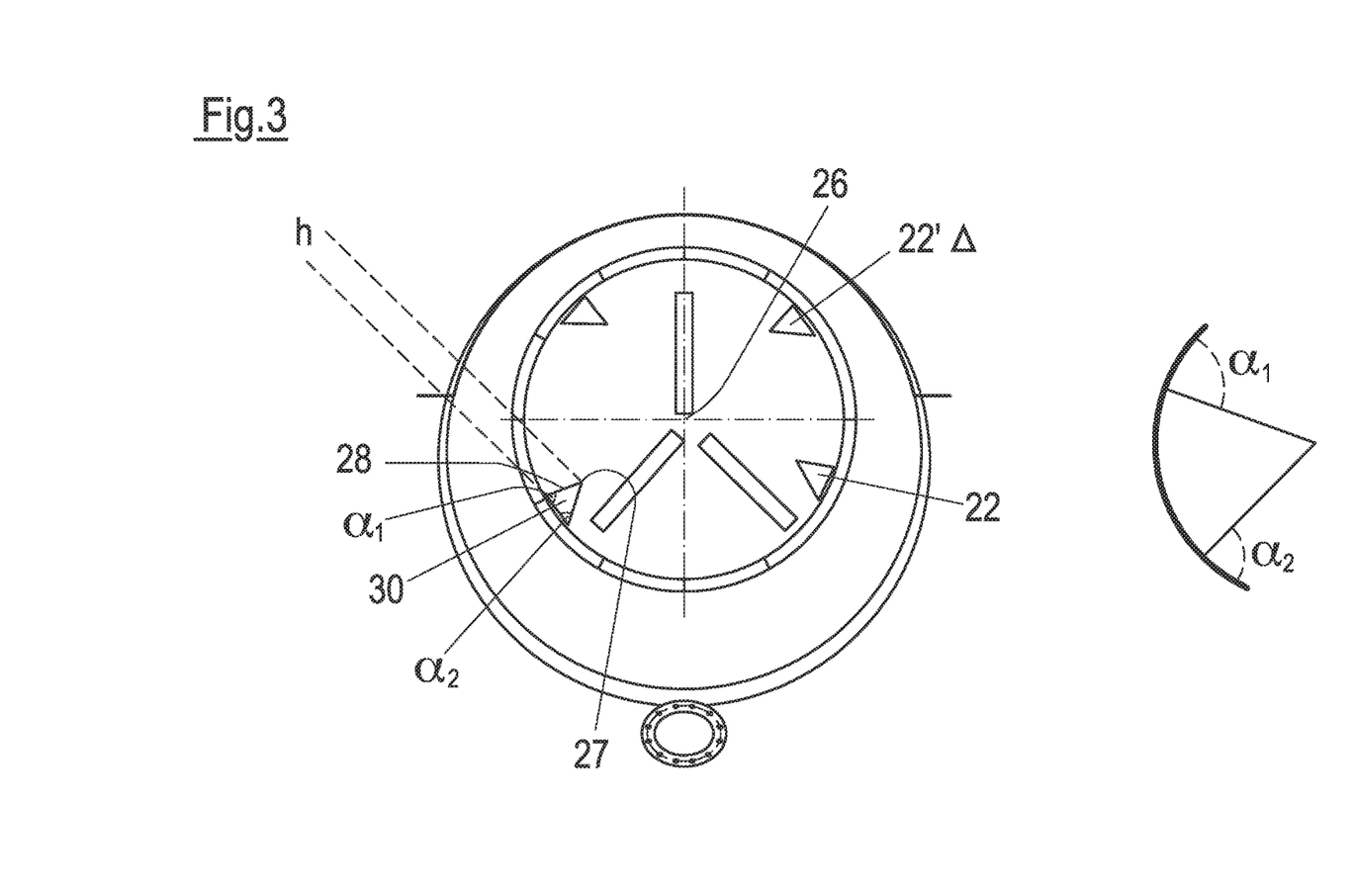
FIG. 3 a cross-sectional view of the apparatus shown in FIGS. 1 and 2 along the sectional plane A-A shown in FIG. 2.

The apparatus 10 shown in FIGS. 1 to 3 for processing composite materials containing fibers comprises a dual tank 12 which comprises an inner drum-like tank 14 and an outer tank 16.

As can in particular be seen from FIG. 2, the inner drum-like tank 14 is hollow cylindrical and comprises a hollow cylindrical drum jacket 18 which is closed by a face base 20 at one of its two face ends and is open at its oppositely disposed face end. In this respect, the drum jacket 18 has at its end adjacent to the face base 20 a section at which a plurality of baffles 22, 22' are arranged at the inner side of the peripheral surface of the drum jacket 18 which extend in the longitudinal direction of the drum jacket 18, and indeed starting from the face base, over approximately 40% of the length of the drum jacket 18, i.e. the baffles 22, 22' extend—starting from the end provided with the face base 20, viewed in the longitudinal axis of the drum jacket 18—over 5 to 35% of the elongate extent of the drum jacket 18. As shown in FIG. 3, four baffles 22, 22' are provided in this section which are distributed evenly over the inner surface of the drum jacket 18. In this respect, the individual baffles 22, 22' have an asymmetrical cross-section. The baffles 22, 22' specifically have a wedge-shaped cross-section which is divided into two parts 28, 30 by the straight line extending from the central longitudinal axis 26 of the drum jacket 18 in the radial direction through the wedge tip 27, wherein the first angle $\alpha_1$ between the straight line extending from the central longitudinal axis 26 of the drum jacket 18 in the radial direction through the wedge tip and the line bounding the first part 28 of the baffle 22, starting from the wedge tip, differs from the second angle $\alpha_2$ between the straight line extending from the central longitudinal axis 26 of the drum jacket 18 in the radial direction through the wedge tip and the line bounding the second part 30 of the baffle 22, starting from the wedge tip. It is thereby achieved that, in dependence on the direction of rotation of the inner tank 14, different mechanical stresses can be exerted on the mixture contained therein. In this respect, the baffles 22, 22' have a height h of 5 cm, with the height h being determined from the wedge tip up to the point disposed perpendicular thereunder on the peripheral surface of the drum jacket 18. At its face base 20, the inner tank 14 is connected to a rotatable axle and to a rotating motor via which the inner tank can be rotated step-wise in both peripheral directions of the inner tank 14.

In addition, the drum jacket 18 has at its end disposed opposite the face base 20 a section at which a plurality of screen holes 24 are arranged in the peripheral surface of the drum jacket 18 which extend—starting from the end provided with the face base 20, viewed in the longitudinal axis of the drum jacket 18—over 50 to 80% of the longitudinal extent of the drum jacket periphery. In this respect, the individual screen holes 24 are evenly distributed over this section of the peripheral surface of the drum jacket 18 and each have a circular cross-section which is dimensioned with respect to its diameter such that the fraction rich in fibers can pass through the screen holes 24, but not the pulp of fiber-free residual material such as plastic and, optionally, metal formed in the inner tank 14.

In addition, the drum jacket 18 has at its inner surface a deflection means 23 which is of spiral shape and which extends over almost the total length of the drum-like tank 18.

The outer tank 16 has the shape of an asymmetrical truncated cone, wherein the upper half of the peripheral surface of the asymmetrical truncated cone has an angle $\beta_1$ of approximately 90° to the base surface of the asymmetrical truncated cone and the lower half of the peripheral surface of the asymmetrical truncated cone has an angle $\beta_2$ of approximately 70° to the base surface of the asymmetrical truncated cone.

In this respect, the outer tank 16 is arranged such that it surrounds the drum jacket 18 of the inner tank 14 over the full area by approximately 80%, starting from the end provided with the face base 20, viewed in the longitudinal axis of the drum jacket 18. At its end facing the end of the drum jacket 18 of the inner drum-like tank 14 provided with the face base 20, the outer tank 16 is bounded by a torispherical head 33.

The outer tank 16 is furthermore arranged such that an intermediate space 34 is formed between the outer surface of the inner tank 14 and the inner surface of the outer tank 16.

In accordance with the invention, the dual tank 12 is pivotable in the vertical plane. This is achieved in the embodiment shown in FIGS. 1 to 3 in that the dual tank 12 is supported on a pivotable rack 36. In this respect, the rack 36 has two arms 38 which extend in parallel with the longitudinal direction of the outer tank 16. At the end disposed opposite the face base 20 of the inner tank 14, the two arms 38 are connected via a cross-beam 40 on which the end of the inner tank 14 disposed opposite the face base 20 lies. At the end disposed opposite this cross-beam 40, the arms 38 of the rack are likewise connected by a cross-beam 42 which is connected to a pivot mechanism 44 via which the pivot angle of the dual tank 12 can be set.

Figure 4:
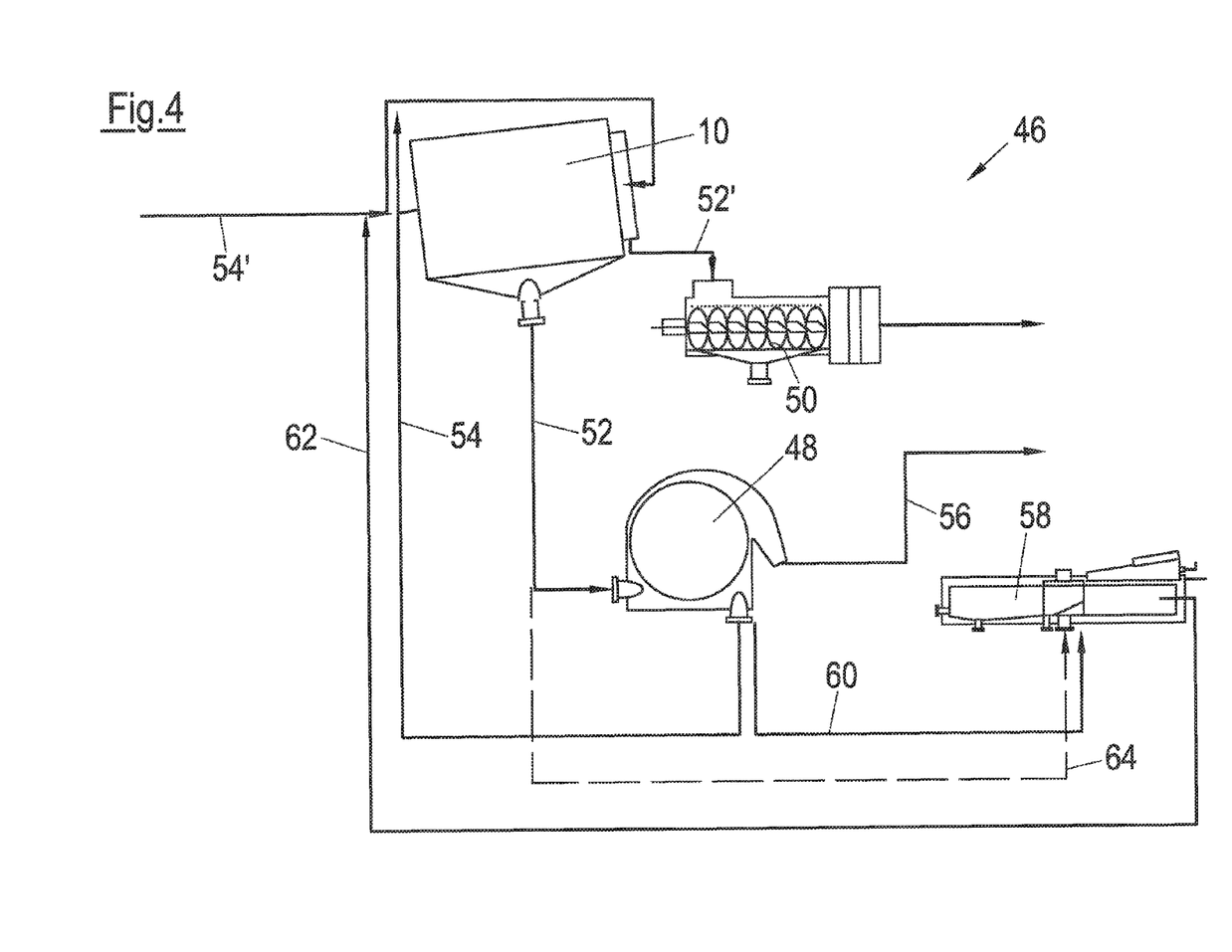
FIG. 4 a schematic view of a plant for processing composite materials containing fibers in accordance with an embodiment of the present invention.

The plant 46 shown in FIG. 4 for processing composite materials containing fibers comprises an apparatus 10 as shown in FIGS. 1 to 3 and configured as described above, a solid/liquid separation apparatus 48 in the form of a disk thickener and a press 50 in the form of a screw press.

In this respect, the solid/liquid separation apparatus 48 is connected via a line 52 to the intermediate space 34 of the dual tank 12 of the apparatus 10, wherein the solid/liquid separation apparatus 48 is supplied continuously or lot-wise via the line 52 from the intermediate space 34 of the dual tank 12 to the fraction rich in fiber removed from the apparatus 10. The fraction rich in fiber is separated in the solid/liquid separation apparatus 48 into water and into a thickened suspension rich in fibers, wherein the water is led back from the solid/liquid separating deice 48 into the hollow cylindrical drum jacket 18 of the inner drum-like tank 14 via a liquid return line 54, and indeed together with fresh water which is supplied via the line 54'. In contrast, the thickened suspension rich in fibers is guided via a fiber removal line 56 as a recyclable fraction 1 for reuse e.g. in a paper-making factory.

The filtrate of the solid/liquid separation apparatus 48 is guided via the liquid line 60 to a dissolved air filtration device 58 and is further purified there so that water having fresh water quality is removed from the dissolved air filtration device 58 and is returned into the apparatus 10 via the fresh water return line 62. The consumption of fresh water supplied via the line 54' can thereby be substantially reduced, which results in significant cost savings.

At the end of the process, a pulp containing plastic and, optionally, metal is led off from the inner space of the inner drum-like tank 14 and is led via the line 52' into the screw press 50 and is dried to form the recyclable fraction 2 containing plastic.

In addition, the plant 46 can comprise a bypass line 64 via which washing water removed directly from the intermediate space 34 of the apparatus 10, i.e. without running through the solid/liquid separation apparatus 48, can be supplied into the dissolved air flotation device 34 for purification. Such a bypass line 64 is in particular sensible when a pre-purification of the starting material such as described below should take place in the apparatus 10.

On the operation of the plant 46, the dual tank 12 is first pivoted upwardly with the end of the inner tank 14 disposed opposite the end provided with the face base 20 such that the longitudinal axis of the drum-like tank adopts an angle $\gamma_1$ of 5 to 90° with respect to the horizontal plane. The composite material containing fibers to be processed and a lot of water are then poured into the inner space of the hollow cylindrical drum jacket 18 of the inner tank 14 pivoted in the step a) and the composite material containing fibers is pre-purified and in this respect in particular liberated from fat and milk residues. For this purpose, the inner tank 14 is first slowly rotated in one of its two peripheral directions and the washing water which has flowed during the rotation over the screen holes 24 and/or over screen holes (not shown) provided at the face base 20 of the inner tank 20 into the intermediate space 34 of the dual tank 12 is then removed from the intermediate space 34 and is directly supplied via the bypass line 64 to the dissolved air filtration device 58 for purification. The purified water is then returned into the apparatus 10 via the fresh water return line 62.

The inner tank 14 is subsequently rotated about one of its two peripheral directions for a duration in time $t_1$. On the rotation, the water is intensely mixed with the composite material containing fibers to be processed and is mechanically strained by the baffles 22, 22', which promotes the dissolving of the composite material containing fibers into its components of fiber material, plastic and, optionally, metal. At the same time, any remaining organic contaminants are flushed out of the composite material. After this dissolving step, the pivot angle of the dual tank 12 is reduced to an angle $\gamma_2$ with respect to the horizontal plane, where $0 \leq \gamma_2 < \gamma_1$, and the inner drum-like tank 14 is rotated about one of its two peripheral directions for a duration in time $t_2$. In this respect, the baffles 22, 22' are at least partly exposed so that the mixture present in the inner space of the inner tank 14 is strained mechanically even more when it runs over the baffles 22, 22'. In addition, the mixture present in the inner space of the inner tank 14 also contacts the section of the drum jacket 18 in which the screen holes 24 are provided due to the reduction of the pivot angle so that the fraction rich in fibers flows through the screen holes 34 into the intermediate space 34 and a pulp-like fraction rich in plastic and, optionally, rich in metal remains in the inner space of the inner tank 14.

Subsequent to this, the pivot angle of the dual tank 12 can optionally again be increased, and indeed to an angle $\gamma_3$ with respect to the horizontal plane, where $\gamma_2 < \gamma_3 \leq 90$, before water for rinsing is introduced into the hollow cylindrical drum jacket 18 of the inner tank 14 and the inner tank is rotated about its longitudinal axis for a duration in time $t_3$. Finally, after the duration in time $t_3$, the pivot angle of the dual tank 12 is reduced to an angle of 0° with respect to the horizontal plane, that is the dual tank 12 is set horizontal and the remaining pulp is removed from the hollow cylindrical drum jacket 18 of the inner drum-like tank 14.

The pulp and the fraction rich in fibers are then further processed in the press or in the thickener, such as has been described above.

REFERENCE NUMERAL LIST 10 apparatus for processing composite materials containing fibers
12 dual tank
14 inner drum-like tank
16 outer tank
18 hollow cylindrical drum jacket
20 face base
22, 22' baffle
24 screen hole
26 central longitudinal axis
27 wedge tip
28 first part of the screen hole
30 second part of the screen hole
32 deflection means
33 torispherical head
34 intermediate space
36 rack
38 rack arm
40 cross-beam
42 cross-beam
44 pivot mechanism
46 plant for processing composite materials containing fibers
48 solid/liquid separation apparatus/disk thickener 50 press/screw press
52, 52' line
54 liquid return line
54 fresh water supply line
56 fiber removal line
58 purification device/dissolved air filtration device
60 liquid line
62 fresh water return line
64 bypass line
$\alpha_1$ angle of the first part of the baffle
$\alpha_2$ angle of the second part of the baffle
$\beta_1$ first angle of the outer tank configured as an asymmetrical truncated cone
$\beta_2$ second angle of the outer tank configured as an asymmetrical truncated cone
h height of the baffle
D diameter of the drum jacket
L length of the drum jacket

The invention claimed is:

1. An apparatus for processing composite materials containing fibers, having a dual tank the dual tank comprising
an inner drum-like tank rotatable in at least one of its two peripheral directions and having a hollow cylindrical drum jacket which is closed at a face base at one of its two face ends and which is open at its oppositely disposed face end, wherein the drum jacket has screen holes at at least a section of its peripheral surface, and wherein at least one baffle is provided at at least one section of the peripheral surface of the drum jacket and/or on the face base; and
an outer tank which at least partly surrounds the drum jacket of the inner drum-like tank such that an intermediate space is formed between the outer surface of the inner drum-like tank and the inner surface of the outer tank; and
wherein the dual tank is pivotable in a vertical plane.

2. The apparatus in accordance with claim 1, wherein the inner drum-like tank is rotatable in at least one of its two peripheral directions at a speed which can be set step-wise.

3. The apparatus in accordance with claim 1, wherein the dual tank can be pivoted step-wise by an angle of 0 to 90° with respect to a horizontal plane; wherein the dual tank is supported on a pivotable rack.

4. The apparatus in accordance with claim 1, wherein at least one inwardly directed baffle is provided at the inner side of at least one section of the peripheral surface of the drum jacket and/or on the face base of the inner drum-like tank.

5. The apparatus in accordance with claim 1, wherein the at least one baffle is arranged at an inner side of a section of the peripheral surface of the drum jacket adjacent to the face base and/or on the face base.

6. The apparatus in accordance with claim 5, wherein the at least one baffle or, if more than one baffle is provided, at least some of the baffles is/are arranged at the inner side of a section of the peripheral surface of the drum jacket, with the section of the peripheral surface of the drum jacket, starting from the end provided with the face base, viewed along a central longitudinal axis of the drum jacket, extending over 0 to 50% of the longitudinal extent of the drum jacket periphery.

7. The apparatus in accordance with claim 1, wherein the at least one baffle has a wedge-shaped cross-section and a wedge tip, with the at least one baffle being divided into a first part and a second part by a straight line extending from the central longitudinal axis of the drum jacket in the radial direction through the wedge tip, wherein a first angle $\alpha_1$ between the straight line extending in the radial direction through the wedge tip and the line bounding the first part of the baffle, starting from the wedge tip, differing from a second angle $\alpha_2$ between the straight line extending in the radial direction through the wedge tip and a line bounding the second part of the baffle, starting from the wedge tip; and wherein the first angle $\alpha_1$ amounts to between 45 and 165 and the second angle $\alpha_2$ amounts to between 165 and 45.

8. The apparatus in accordance with claim 1, wherein the screen holes are arranged on a section of the peripheral surface of the drum jacket of the inner drum-like tank, with the section of the peripheral surface of the drum jacket, starting from the end provided with the face base, viewed along a longitudinal axis of the drum jacket, extending over 60 to 95% of a longitudinal extent of the drum jacket periphery.

9. The apparatus in accordance with claim 1, wherein, in addition to the screen holes arranged on the peripheral surface of the drum jacket of the inner tank, at least one or more further screen holes are arranged on the face base of the inner tank.

10. The apparatus in accordance with claim 1, wherein the outer tank surrounds the drum jacket of the inner drum-like tank, starting from the end provided with the face base, viewed along a longitudinal axis of the drum jacket, over the full area by at least 50%.

11. The apparatus in accordance with claim 1, wherein the outer tank is bounded by a torispherical head at its end facing the end face of the drum jacket of the inner drum-like tank provided with the face base.

12. The apparatus in accordance with claim 1, further comprising at least one deflection means that is provided at an inner surface of the inner drum-like tank, with the at least one deflection means being of spiral shape.

13. The apparatus of claim 1, wherein the dual tank can be pivoted step wise by an angle of 0 to 90° with respect to a horizontal plane; and
wherein at least one inwardly directed baffle is provided at the inner side of the inner drum-like tank.

14. The apparatus of claim 1, wherein the dual tank is during operation of the apparatus pivotable in a vertical plane.

15. A plant for processing composite materials containing fibers, said plant comprising:
an apparatus having a dual tank, the dual tank comprising
an inner drum-like tank rotatable in at least one of its two peripheral directions and having a hollow cylindrical drum jacket which is closed at a face base at one of its two face ends and which is open at its oppositely disposed face end, wherein the drum jacket has screen holes at at least a section of its peripheral surface, and wherein at least one baffle is provided at at least one section of the peripheral surface of the drum jacket and/or on the face base; and
an outer tank which at least partly surrounds the drum jacket of the inner drum-like tank such that an intermediate space is formed between the outer surface of the inner drum-like tank and the inner surface of the outer tank; and
wherein the dual tank is pivotable in a vertical plane;
a solid/liquid separation apparatus; and
a press.

16. The plant in accordance with claim 15, wherein the solid/liquid separation apparatus is connected via a line to the intermediate space of the dual tank of the apparatus and the solid/liquid separation apparatus is a thickener, a forming board or a screen; and wherein a liquid return line leads from the solid/liquid separation apparatus into the hollow cylindrical drum jacket of the inner drum-like tank.

17. The plant in accordance with claim 15, further comprising a dissolved air flotation device, a centrifuge device or a sedimentation device which is connected via a liquid line to the solid/liquid separation apparatus.

18. A method of processing composite materials containing fibers, said method comprising the following steps:
   a) pivoting a dual tank of an apparatus having the dual tank, the dual tank comprising:
      an inner drum-like tank rotatable in at least one of its two peripheral directions and having a hollow cylindrical drum jacket which is closed at a face base at one of its two face ends and which is open at its oppositely disposed face end, wherein the drum jacket has screen holes at at least a section of its peripheral surface, and wherein at least one baffle is provided at at least one section of the peripheral surface of the drum jacket and/or on the face base; and
      an outer tank which at least partly surrounds the drum jacket of the inner drum-like tank such that an intermediate space is formed between the outer surface of the inner drum-like tank and the inner surface of the outer tank; and
      wherein the dual tank is pivotable in a vertical plane; wherein the pivoting is performed such that the longitudinal axis of the drum-like tank adopts an angle $\gamma_1$ of 5 to 90° with respect to the horizontal plane;
   b) introducing composite material containing fibers to be processed and water into the inner space of the hollow cylindrical drum jacket of the inner drum-like tank pivoted in the step a) and rotating the inner drum-like tank about one of its two peripheral directions for a duration in time $t_1$;
   c) reducing the pivot angle of the dual tank to an angle $\gamma_2$ with respect to the horizontal plane, where $0 \leq \gamma_2 < \gamma_1$, and rotating the inner drum-like tank about one of its two peripheral directions for a duration in time $t_2$;
   d) optionally, increasing the pivot angle of the dual tank to an angle $\gamma_3$ with respect to the horizontal plane, where $\gamma_2 < \gamma_3 \leq 90°$, introducing water into the hollow cylindrical drum jacket of the inner drum-like tank and rotating the inner drum-like tank about its longitudinal axis for a duration in time $t_3$;
   e) reducing the pivot angle of the dual tank to an angle of 0° with respect to the horizontal plane and removing the remaining pulp from the hollow cylindrical drum jacket of the inner drum-like tank.

19. The method in accordance with claim 18, wherein the angle $\gamma_1$ in the step a) and/or the angle $\gamma_3$ in the step d) is/are set to a value of 5 to 60°.

20. The method in accordance with claim 18, wherein a suspension containing fibers is removed from the intermediate space of the dual tank during the step b), and/or between the steps b) and c), and/or during the step c), and/or between the steps c) and d), and/or during the step d), and/or between the steps d) and e), and/or after step e), and the suspension containing fibers is led into a solid/liquid separation apparatus and is separated into a fraction rich in water and into a fraction rich in fibers.

21. The method in accordance with claim 18, wherein the remaining pulp removed in the step e) is led into a press and is dried there.

22. The method in accordance with claim 18, wherein composite material which contains fibers is introduced into the inner drum-like tank in the step b), with the packaging material comprising i) fiber material, ii) plastic, and optionally iii) aluminum foil.

* * * * *